Sept. 29, 1942.  A. SCHÜTTE  2,297,508
ROTOR FOR TURBINES
Filed March 1, 1941

Inventor:
Alfred Schütte
By Maréchal + Noé
Atty:

Patented Sept. 29, 1942

2,297,508

UNITED STATES PATENT OFFICE 2,297,508

ROTOR FOR TURBINES

Alfred Schütte, Augsburg, Germany; vested in the Alien Property Custodian

Application March 1, 1941, Serial No. 381,367
In Germany February 29, 1940

5 Claims. (Cl. 253—39)

This invention relates to a rotor made of ceramic masses and intended for turbines, particularly gas turbines.

Rotors for turbines, especially gas turbines, which have to be operated at high gas temperatures to be economical, are extraordinarily highly stressed machine parts. When the gas temperatures exceed 700° C., rotors made from steel will not stand the stress, and for this reason both the rotors and blades of gas turbines are manufactured from ceramic and similar materials which possess sufficient strength even at very high temperatures. In order to keep the stress on the rotor at high temperatures within reasonable limits it is advisable to construct the rotor as a solid disc without a central bore, since the bore tends considerably to increase stress. If the disc together with the shaft journals on both ends is made entirely of ceramic masses, manufacture is rendered extraordinarily difficult, and the critical bending moment will be relatively low. Furthermore, the arrangement of a shaft of ceramic masses involves particular difficulties, since in view of the uneven thermal expansion of ceramic masses and steel it is quite a problem how to satisfactorily secure a steel shell that has to run in a journal bearing, or an antifriction bearing, to the shaft ends made of a ceramic mass.

According to the invention, these troubles are eliminated by manufacturing only the solid rotor disc from ceramic materials and securing on both sides thereof shaft ends of steel. The steel shaft ends are attached to the rotor by being introduced with play into short tubular projections located on both sides of the rotor, the amount of play being largest in cold condition and decreasing with increasing temperature, since the steel shafts during heating expand more than the tubular projections made of ceramic mass. In further accordance with the invention the play is therefore chosen so that even at maximum temperature splitting of the ceramic projections by the steel shafts is absolutely prevented. The shaft butts are attached to the rotor in known manner by radially inserting several cylindrical pins in both the tubular projections and the shaft ends in consequence whereof the latter always maintain a concentric position relative to the rotor even in view of the play provided for.

One form of the invention is illustrated by way of example in the accompanying drawing, in which—

Figure 1:
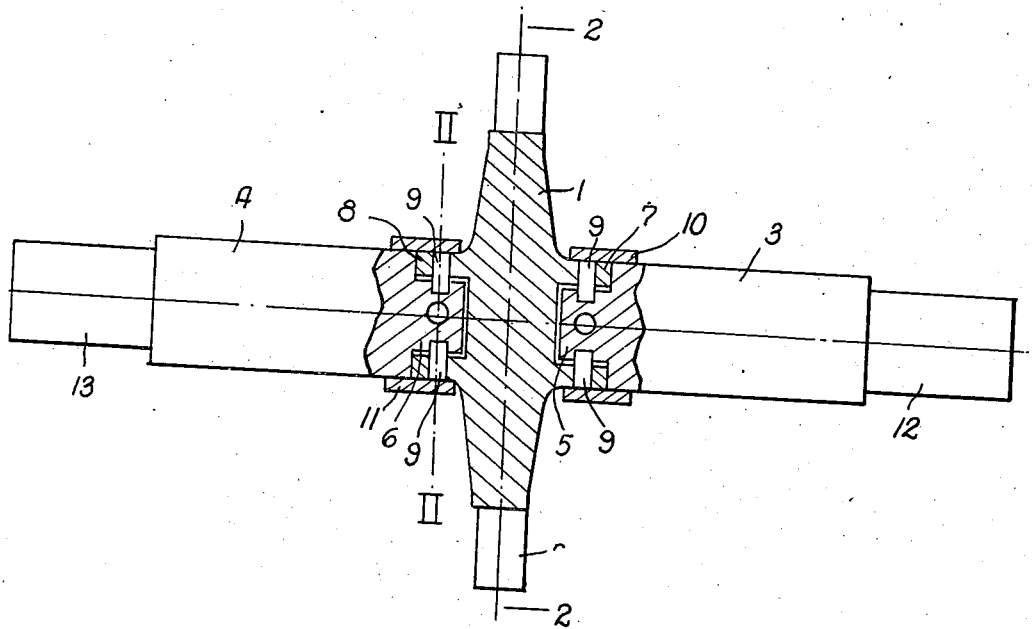
Figure 2:
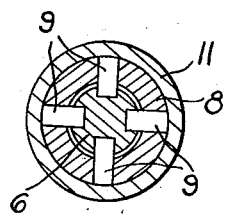

Figure 1 is a partial longitudinal section of a rotor according to the invention and Fig. 2, a cross section on the line II—II, of Fig. 1.

The rotor comprises a solid disc 1 made of ceramic mass, moving blades 2, also made of ceramic mass and preferably integral with the disc 1, and steel shaft ends 3, 4 which have their cylindrical end portions 5, 6 extending into tubular projections 7, 8 of the disc 1 and connected therewith by radially directed cylindrical pins 9. To keep the pins 9 in position during operation rings 10, 11 are slipped over the shaft ends 3, 4 and are detachably connected therewith so that they partake in the rotation thereof. The rotor is disposed in the turbine casing, not shown, by means of pins 12, 13.

The provision of the disc 1 with the steel shaft ends 3, 4 affords also special advantages with respect to the construction of the rotor according to the invention. As strictly speaking the shaft ends and the rotor contact only at the radial pins 9, the heat flow from the rotor to the shaft ends 3, 4 meets with considerable resistance so that the bearing can be kept cool more easily. The cooler shaft ends 3, 4 may be cooled inside without any fear of trouble, whereby the temperature thereof is lowered still more. If the shaft ends are relatively cool, the amount of expansion that takes place under operating conditions in the shaft ends is reduced, and the play between the ends 3, 4 and the tubular projection 7, 8 may thus be relatively slight even in cold condition.

What is claimed is:

1. A rotor for turbines subjected to varying temperature conditions, comprising a solid disc of ceramic material, blades on said disc, steel shafts one projecting from each side of the disc, said disc having side portions of ceramic material interfitting with the ends of the shafts but with radial clearance between the shaft ends and the side portions of the disc to provide freedom for radial expansion of the shaft and said side portions with relation to one another where they extend one into another, and centering means securing the shaft ends to the respective side portions of the disc in definite coaxial relation and affording freedom of radial expansion and contraction of the shaft ends and the side portions at relatively different rates without stressing the said side portions due to such expansion and contraction.

2. A rotor for turbines subjected to varying temperature conditions, comprising a disc of ceramic material, blades on said disc, steel shafts one projecting from each side of the disc, said disc having side portions of ceramic material interfitting with the ends of the shafts but with radial clearance between the shaft ends and the side portions of the disc to avoid stressing the said side portions due to differences in the coefficient of expansion of the shaft ends and the ceramic material, and radially extending centering means securing the shaft ends to the respective side portions of the disc in concentric relation while affording freedom of radial expansion and contraction of the shaft ends and said side portions at relatively different rates without stressing the said side portions.

3. A rotor for turbines operable under high temperature conditions, comprising a disc of ceramic material having an integral hollow projection at a side of the disc and concentric therewith, blades on the disc, a metal shaft having a comparatively high coefficient of expansion compared with the coefficient of the ceramic disc, said shaft having an end portion extending into said projection with radial clearance between the outside of the shaft end and the inside of said projection, and a series of circumferentially spaced radially extending torque transmitting members securing the shaft end to said projection in definite coaxial relation while affording freedom of radial expansion and contraction of the shaft ends and said side portions at relatively different rates.

4. A rotor for turbines operable under high temperature conditions, comprising a solid disc of ceramic material having side projections of ceramic material at opposite sides thereof, a series of turbine blades on the rotor, steel shafts one extending from each side of the disc coaxial therewith, the adjacent ends of the shafts extending into said side projections with radial clearance under operating conditions between the outer surfaces of the shaft ends and the inner surfaces of the side projections, and radially extending torque transmitting means between said shafts and said projections.

5. A rotor for turbines operable under high temperature conditions, comprising a solid disc of ceramic material having side projections at opposite sides thereof, a series of turbine blades on the rotor, steel shafts one extending from each side of the disc coaxial therewith, the adjacent ends of the shafts extending into said side projections with radial clearance between the outer surfaces of the shaft ends and the inner surfaces of the side projections, a series of circumferentially spaced radially extending pins securing the ends of the shafts to said side projections and centering the shafts coaxially with the disc, and a ring around each of said side projections retaining the pins in position.

ALFRED SCHÜTTE.